Aug. 18, 1970  C. R. BRUCE  3,525,089
TELEMETER OF MECHANICAL DISPLACEMENT
Filed March 17, 1966  2 Sheets-Sheet 1

INVENTOR
CHARLES R. BRUCE

BY Sughrue, Rothwell, Mion,
Zinn & Macpeak
ATTORNEYS

ABSTRACT OF THE DISCLOSURE

A telemetering system includes a D.C. operable mechanical oscillator at a first location for controlling the generation of clock pulses and for controlling the generation of an electrical signal representing mechanical displacement. A pair of pulses, time separated by an amount proportional to a mechanical displacement, are synchronously related to the clock pulses. The pair of pulses and clock pulses are sent via a transmission line to a second location where the clock pulses are separated from the pair of pulses and used to provide a measure of the mechanical displacement.

---

The present invention relates to a system for telemetering measured conditions from a first location to a second location in the form of time displaced pulses wherein the time displacement is proportional to the value of the measured condition, and more particularly, the invention relates to a time displaced pulse telemetering system wherein the time between the time displaced pulses is determined by counting the number of clock frequency cycles which occur between the time displaced pulses.

It is well known in the telemetering art to measure a condition, such as pressure, at a remote location, for example, a borehole, convert the measured condition into mechanical displacement, and further convert the mechanical displacement into time displaced electrical pulses which are transmitted to a measuring or second location. In a typical example of such prior art systems, the first pulse of the time displaced pulses occurs at the same time within each period, whereas the second pulse occurs at varying times. It is of particular importance in such systems to provide clock pulses at the measuring station for the purpose of accurately measuring the time between the time displaced pulses. It is obvious that the greater the frequency of the clock signal with respect to the frequency of the time displaced pulses, the greater will be the measurement resolution. Also, for accuracy in the measurement, it is necessary that the clock frequency be synchronous with the pulse frequency.

In the prior art systems, synchronization between the pulse frequency and clock frequency is obtained by using an A.C. signal generated at the measuring station which controls the clock frequency formation at the measuring station and also controls the pulse frequency at the remote station. As a specific example, the A.C. signal is transmitted via the transmission line to the remote location where it controls a synchronous motor which in turn rotates the rotating arm of the condition measuring device. The same A.C. signal controls a synchronous motor at the measuring location which in turn controls the generation of clock pulses.

A disadvantage of the prior art systems is that for synchronization it is necessary to transmit the A.C. controlling voltage over the transmission line. In the present invention, the clock signal is produced at the borehole location by the same mechanism which mechanically controls the rotating contact arm of the measuring device, and therefore, it is unnecessary to transmit A.C. power from the measuring location to the remote location. The advantages achieved by this feature are, less electrical power is required, there is no concern over maintaining synchronism, the system does not require a D.C. to A.C. power converter, calibration oscillators or frequency dividers, and the signal-to-noise ratio is improved since there is no alternating current power on the transmission line.

It is, therefore, an object of the present invention to provide a new and improved telemetering system wherein the clock frequency and the frequency of the time displaced pulses are controlled by a mechanical oscillator at the remote location.

It is a further object of the present invention to provide a new and improved telemetering system which has an improved signal-to-noise ratio and requires no A.C. power on the transmission line.

The foregoing and other objects, features and advantages of the invention will be apparent from the following more particular description of the invention.

Figure 1:
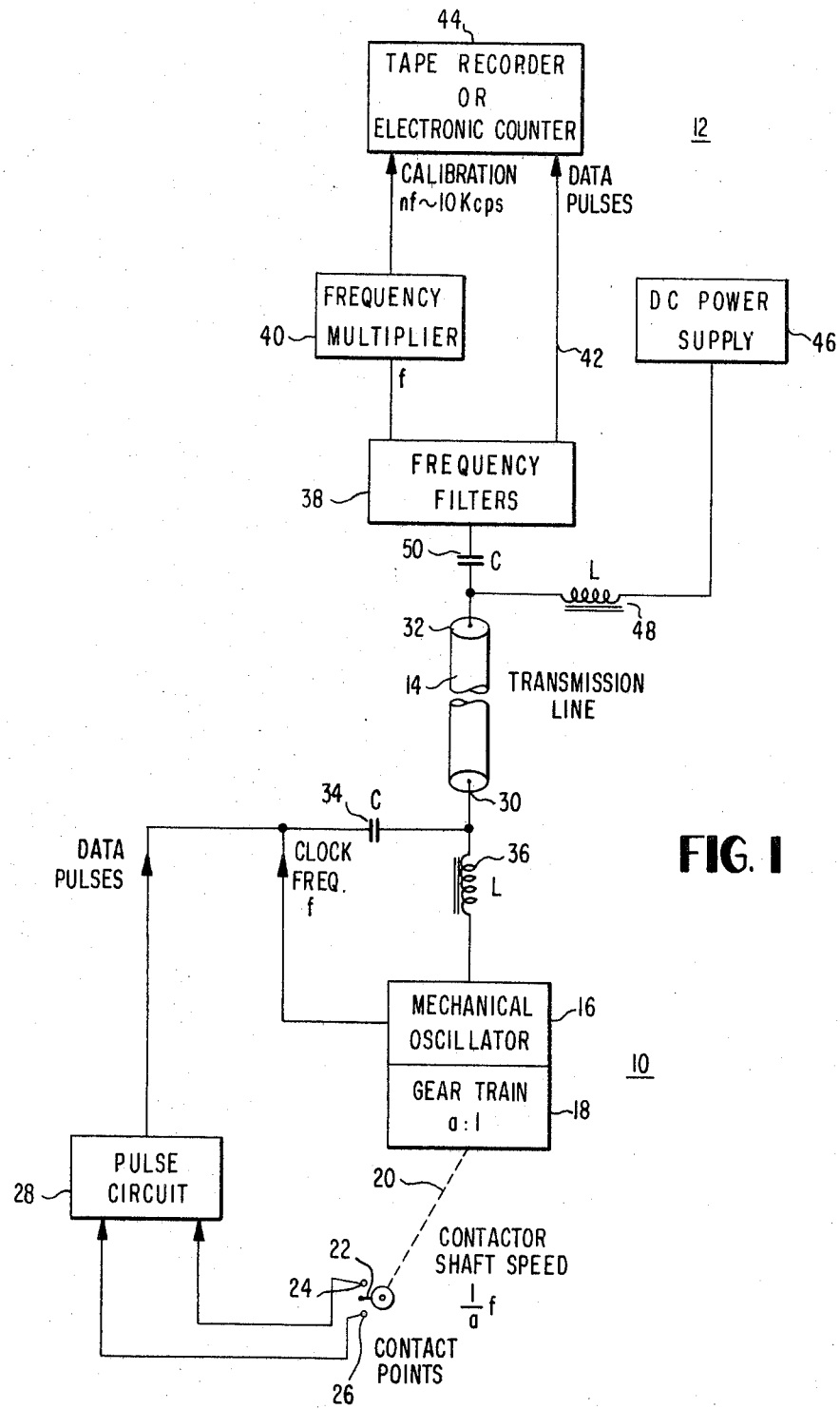
FIG. 1 is a block diagram of a preferred embodiment of a telemetering system constructed in accordance with this disclosure.
Figure 2:
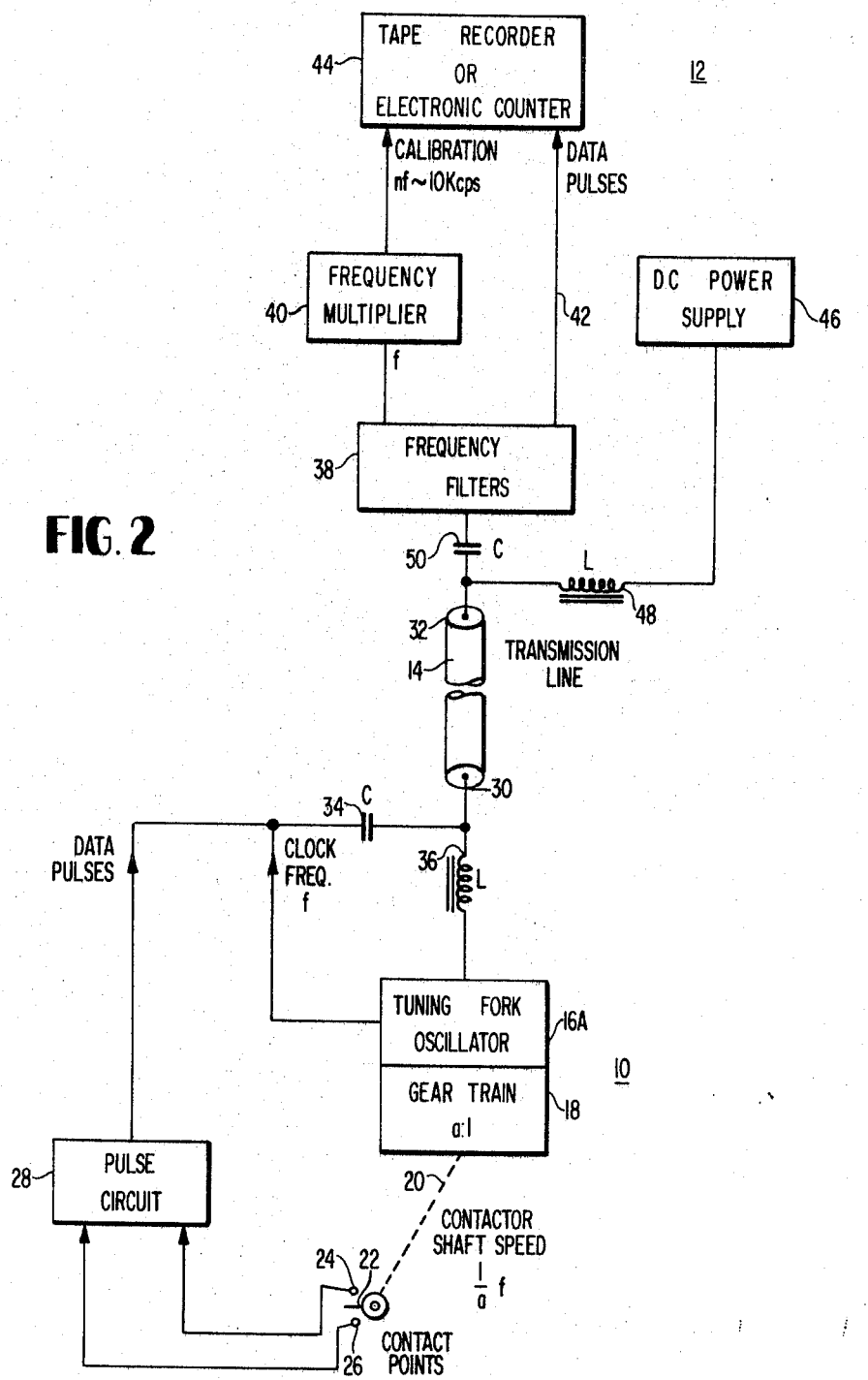
FIG. 2 illustrates the use of a particular type of mechanical oscillator, viz. an Accutron tuning fork movement.

FIG. 1 shows a measuring and generating unit 10 which is located at the remote or first location, a receiving and indicating unit 12 which is located at the measuring station or second location, and a transmission line 14 having terminal 30 at the first location and terminal 32 at the second location. The first location, as indicated, includes a mechanical oscillator 16 which may be any type of oscillator which has both a mechanical and an electrical output, a gear train 18 and a pulse forming circuit 28. A particularly preferred mechanical oscillator for use with the present invention is the compact Accutron type of tuning fork movement manufactured by the Bulova Watch Company, as illustrated in FIG. 2. The output of gear train 18 is a rotating shaft 20 which controls rotating contact 22 which comes into contact with stationary contact 24 and displaced contact 26. The operation of contacts 22, 24 and 26 in combination with pulse circuit 28 produces pulses at the output of pulse circuit 28 which are displaced in time relative to the mechanical displacement of contact 26 with respect to contact 24. The mechanical displacement of the contacts 24 and 26 is in turn controlled by the condition being measured, such as pressure. The particular measuring device and pulse producing system forms no part of the present invention, but one such system which may advantageously be used is shown and described in application Ser. No. 518,632, by C. R. Bruce and I.D. Johnson, filed on Jan. 4, 1966, and assigned to the assignee of the present invention.

The receiving station 12 includes frequency filters 38 which are adapted to separate the received clock signal from the received time displaced pulses, and a tape recorder or electronic counter which counts the number of clock pulses between the two time displaced pulses and registers an indication of the time between the time displaced pulses. For greater resolution, a frequency multiplier 40 may be included in the circuit between the clock frequency output of frequency filters 38 and the calibration input of the tape recorder or electronic counter unit 4. Also, the D.C. power necessary to operate the mechanical oscillator at the measuring and transmitting station 10 may be supplied via transmission line 14 by a D.C. power supply 46 which is located at the receiving station. The circuit also includes an A.C. blocking means, such as inductor 48, and a D.C. blocking means, such as capacitor 50, in the receiving station, and an A.C. blocking means 36 and D.C. blocking means 34 at the measuring and generating station 10. As an alternative, it is possible to use a battery located at the measuring and generating station 10 for operating the mechanical oscillator 16.

The telemetering system operates in the following manner. The D.C. power from power supply 46 is transmitted via transmission line 14 and is applied to mechanical oscillator 16 which may be, for example, a D.C. controlled motor or a tuning fork. The electrical output of the oscillator 16 is coupled to the transmission line 14 at terminal 30 via D.C. blocking capacitor 34. The mechanical output of the oscillator drives a gear train having an input to output ratio α so that the output shaft 20 rotates at a frequency equal to $f/a$, where $f$ is the clock frequency. Movable contact 22 rotates with the shaft and comes into electrical contact with fixed contact 24 and displaced contact 26 once during each cycle of rotation. Since the displaced contact 26 is at a distance with respect to fixed contact 24 related to a physical quantity, such as pressure, the pulses formed by contact with fixed contact 24 and displaced contact 26 are separated in time by an amount which is directly related to the physical quantity being measured. Furthermore, the pulses which are produced by pulse circuit 28 may be of opposite polarity, as is explained in the above-mentioned application. The time displaced pulses produced by pulse circuit 28 are also transmitted to the receiving station via transmission line 14. Since the clock frequency and the rotational frequency of the contact 22 are controlled by the same mechanical means, synchronization of the data or time displaced pulses and the clock frequency is automatic and there is no need to provide an additional means at the receiving station for ensuring synchronism.

What is claimed is:

1. In a telemetering system of the type which transmits information of a measured condition from a first location, where said condition is converted into a pair of pulses having a separation dependent on said condition, to a second location, where the number of cycles of a clock frequency occurring between said pair of pulses is used to measure said condition, the improvement comprising,
    (a) a mechanical oscillator at said first location,
    (b) means at said first location responsive to said mechanical oscillator for providing an electrical clock frequency output, and
    (c) means at said first location, responsive to said mechanical oscillator output and said condition being measured for providing said pair of pulses, said pulse providing means comprising
        (i) a first movable contact;
        (ii) a fixed contact;
        (iii) a condition displaced contact;
        (iv) a pulse producing circuit means responsive to the electrical touching of said fixed contact to said movable contact for producing one of said pair of pulses and responsive to the electrical touching of said displaced contact to said movable contact for producing the other of said pair of pulses; and
        (v) mechanical transmission means connected between said mechanical oscillator and said movable contact for causing said movable contact to come into electrical contact with said fixed contact and said displaced contact once each period, wherein said period is controlled by said mechanical oscillator frequency, and
    (d) means for transmitting simultaneously said pair of pulses and said electrical clock frequency output to said second location, and
    (e) means at said second location for measuring the time separation between said pair of pulses.
2. A telemetering system as claimed in claim 1 wherein said mechanical oscillator is a D.C. operated motor.
3. A telemetering system as claimed in claim 2 wherein said mechanical transmission means comprises a gear train adapted to rotate said movable switch at a frequency which is a submultiple of said mechanical oscillator frequency.
4. A telemetering system as claimed in claim 3 further comprising an A.C. blocking means connected between said transmitting means and the D.C. controls of said D.C. operated motor.
5. A telemetering system as claimed in claim 4 further comprising D.C. blocking means connected between said transmitting means and the outputs of said clock frequency providing means and said pulse producing circuit means.
6. In a telemetering system of the type which transmits information of a measured condition from a first location, where said condition is converted into a pair of pulses having a separation dependent on said condition, to a second location where the number of cycles of a clock frequency occurring between said pair of pulses is used to measure said condition, the improvement comprising,
    (a) a mechanical oscillator at said first location,
    (b) means at said first location responsive to said mechanical oscillator for providing an electrical clock frequency output,
    (c) means at said first location, responsive to said mechanical oscillator output and said condition being measured for providing said pair of pulses,
    (d) means for transmitting simultaneously said pair of pulses and said electrical clock frequency output of said second location,
    (e) frequency separating means at said second location for separating the received clock frequency signal from said pair of pulses; and,
    (f) means at said second location responsive to the output of said separating means for measuring the time separation of said pair of pulses.
7. A telemetering system as claimed in claim 6 wherein said frequency separating means comprises, a first filter means for passing said received clock frequency signal; a second filter means for passing said pair of pulses, and means for multiplying the frequency of said passed clock frequency signal.
8. A telemetering system as claimed in claim 7 wherein said means for providing said pair of pulses comprises,
    (a) a first movable contact;
    (b) a fixed contact;
    (c) a condition displaced contact;
    (d) a pulse producing circuit means responsive to the electrical touching of said fixed contact to said movable contact for producing one of said pair of pulses and responsive to the electrical touching of said displaced contact to said movable contact for producing the other of said pair of pulses; and
    (e) mechanical transmission means connected between said mechanical oscillator and said movable contact for causing said movable contact to come into electrical contact with said fixed contact and said displaced contact once each period, wherein said period is controlled by said mechanical oscillator frequency.
9. A telemetering system as claimed in claim 8 wherein said means for transmitting is a transmission line having a first terminal at said first location and a second terminal at said second location.
10. A telemetering system as claimed in claim 9 further comprising, an A.C. blocking means, and a D.C. power supply means connected to the second terminal of said transmission line through said A.C. blocking means for supplying D.C. operating power to said first location.
11. A telemetering system as claimed in claim 10 wherein said mechanical oscillator is a D.C. operated motor.
12. A telemetering system as claimed in claim 10 wherein said mechanical oscillator is a tuning fork oscillator.

13. A telemetering system as claimed in claim 12 wherein said mechanical transmission means comprises a gear train adapted to rotate said movable switch at a frequency which is a submultiple of said mechanical oscillator frequency.

14. A telemetering system as claimed in claim 13 further comprising an A.C. blocking means connected between said transmitting means and the D.C. controls of said D.C. operated motor.

15. A telemetering system a sclaimed in claim 14 further comprising D.C. blocking means connected between said transmitting means and the outputs of said clock frequency providing means and said pulse producing circuit means.

References Cited

UNITED STATES PATENTS

| | | | |
|---|---|---|---|
| 2,730,698 | 1/1956 | Daniels et al. | 340—206 |
| 2,974,303 | 3/1961 | Dixon | 340—18 |
| 2,679,757 | 6/1954 | Fay | 73—345 |
| 3,007,134 | 10/1961 | Kolb | 340—18 |
| 3,189,881 | 6/1965 | Reinhart | 340—206 |
| Re. 26,209 | 5/1967 | Bennett | 331—156 |

THOMAS B. HABECKER, Primary Examiner

U.S. Cl. X.R.

340—168, 210

PO-1050
(5/69)

UNITED STATES PATENT OFFICE
CERTIFICATE OF CORRECTION

Patent No. 3,525,089            Dated Aug. 18, 1970

Inventor(s) C. R. Bruce

It is certified that error appears in the above-identified patent and that said Letters Patent are hereby corrected as shown below:

Col. 3, line 13: "α" should read --a--

Col. 5, line 12: "a sclaimed" should read --as claimed--

SIGNED AND
SEALED
DEC 15 1970

(SEAL)
Attest:

Edward M. Fletcher, Jr.
Attesting Officer

WILLIAM E. SCHUYLER, JR.
Commissioner of Patents